United States Patent
Sarma et al.

(10) Patent No.: US 6,688,738 B2
(45) Date of Patent: *Feb. 10, 2004

(54) METHOD FOR REDUCING CAVITATION IN IMPULSE INK JET PRINTING DEVICES

(75) Inventors: Deverakonda S. Sarma, Danbury, CT (US); James E. Fox, Stratford-on Avon (GB); Alan L. Hudd, Nuthampsted (GB); Thyagaraja Sarada, Horsham, PA (US); Brian Salisbury, Middlebury, CT (US); Eda E. Wilson, Stamford, CT (US)

(73) Assignee: Illinois Tool Works Inc, Glenview, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/134,924

(22) Filed: Apr. 29, 2002

(65) Prior Publication Data

US 2003/0107630 A1 Jun. 12, 2003

Related U.S. Application Data

(63) Continuation-in-part of application No. 09/328,652, filed on Jun. 9, 1999, now Pat. No. 6,439,709.
(60) Provisional application No. 60/099,230, filed on Sep. 4, 1998.

(51) Int. Cl.[7] .................................................. B41J 2/01
(52) U.S. Cl. ......................... 347/100; 347/101; 347/96
(58) Field of Search .................. 347/100, 101, 347/95, 96; 106/31.13, 31.6

(56) References Cited

U.S. PATENT DOCUMENTS

| | | |
|---|---|---|
| 3,925,789 A | 12/1975 | Kashio |
| 4,142,905 A | 3/1979 | Cooke |
| 4,176,361 A | 11/1979 | Kawada et al. |
| 4,207,577 A | 6/1980 | Mansukhani |
| 4,255,196 A | 3/1981 | Emmons et al. |
| 4,266,232 A | 5/1981 | Juliana, Jr. et al. |
| 4,290,072 A | 9/1981 | Mansukhani |
| 4,361,843 A | 11/1982 | Cooke et al. |
| 4,401,470 A | 8/1983 | Bridger |
| 4,459,601 A | 7/1984 | Howkins |
| 4,540,997 A | 9/1985 | Biggs et al. |
| 4,597,794 A | 7/1986 | Ohta et al. |
| 4,646,106 A | 2/1987 | Howkins |
| 4,791,165 A | 12/1988 | Bearss et al. |
| 4,793,264 A | 12/1988 | Lin et al. |
| 4,824,485 A | 4/1989 | Tanaka et al. |
| 4,970,527 A | 11/1990 | Gatten |
| 4,971,626 A | 11/1990 | Kveglis et al. |
| 5,006,170 A | 4/1991 | Schwarz et al. |
| 5,154,761 A | 10/1992 | Cooke et al. |
| 5,160,535 A | 11/1992 | Cooke et al. |
| 5,258,774 A | 11/1993 | Rogers |

(List continued on next page.)

FOREIGN PATENT DOCUMENTS

| | | |
|---|---|---|
| EP | 0 688 835 | 6/1995 |
| EP | 0 718 383 | 6/1996 |
| EP | 0 805 192 | 11/1997 |
| GB | 2 148 316 | 10/1984 |
| WO | 96/24642 | 8/1996 |

*Primary Examiner*—Benjamin R. Fuller
*Assistant Examiner*—Manish Shah
(74) *Attorney, Agent, or Firm*—Donald J. Breh; Mark W. Croll; Lisa M. Soltis

(57) ABSTRACT

Methods for reducing cavitation in impulse or drop on demand ink jetting devices are provided. Impulse ink jet compositions including antioxidant are also provided which are suitable for printing clear, well-defined alphanumeric text or low spread, narrow bar width bar codes on porous substrates such as Kraft paper or corrugated cardboard. The antioxidant additive lowers the dissolved oxygen level in the ink, thereby enhancing the jetting performance of the printhead.

20 Claims, 4 Drawing Sheets

U.S. PATENT DOCUMENTS

| | | |
|---|---|---|
| 5,310,778 A | 5/1994 | Shor et al. |
| 5,316,575 A | 5/1994 | Lent et al. |
| 5,329,293 A | 7/1994 | Liker |
| 5,376,169 A | 12/1994 | Hotomi et al. |
| 5,507,864 A | 4/1996 | Jaeger et al. |
| 5,538,548 A | 7/1996 | Yamazaki |
| 5,581,283 A | 12/1996 | Rogers |
| 5,594,044 A | 1/1997 | Yang |
| 5,604,276 A | 2/1997 | Suga |
| 5,658,376 A | 8/1997 | Noguchi et al. |
| 5,663,217 A | 9/1997 | Kruse |
| 5,667,571 A | 9/1997 | Ono et al. |
| 5,674,923 A | 10/1997 | Subbaraman et al. |
| 5,679,138 A | 10/1997 | Bishop et al. |
| 5,710,195 A | 1/1998 | Subbaraman et al. |
| 5,718,746 A | 2/1998 | Nagasawa et al. |
| 5,746,817 A | 5/1998 | Katsen et al. |
| 5,767,873 A | 6/1998 | Rogers et al. |
| 5,781,214 A | 7/1998 | Vonasek et al. |
| 5,837,042 A | 11/1998 | Lent et al. |
| 5,843,219 A * | 12/1998 | Griffin et al. ............... 347/100 |
| 5,846,307 A | 12/1998 | Nagasawa et al. |
| 5,877,235 A | 3/1999 | Sakuma et al. |
| 5,891,231 A | 4/1999 | Gnerlich et al. |
| 5,912,281 A | 6/1999 | Clark et al. |
| 5,913,971 A | 6/1999 | Fujimatsu et al. |
| 6,302,536 B1 | 10/2001 | Sarma et al. |
| 6,391,943 B2 | 5/2002 | Sarma et al. |
| 6,439,709 B1 * | 8/2002 | Sarma et al. ............... 347/100 |

\* cited by examiner

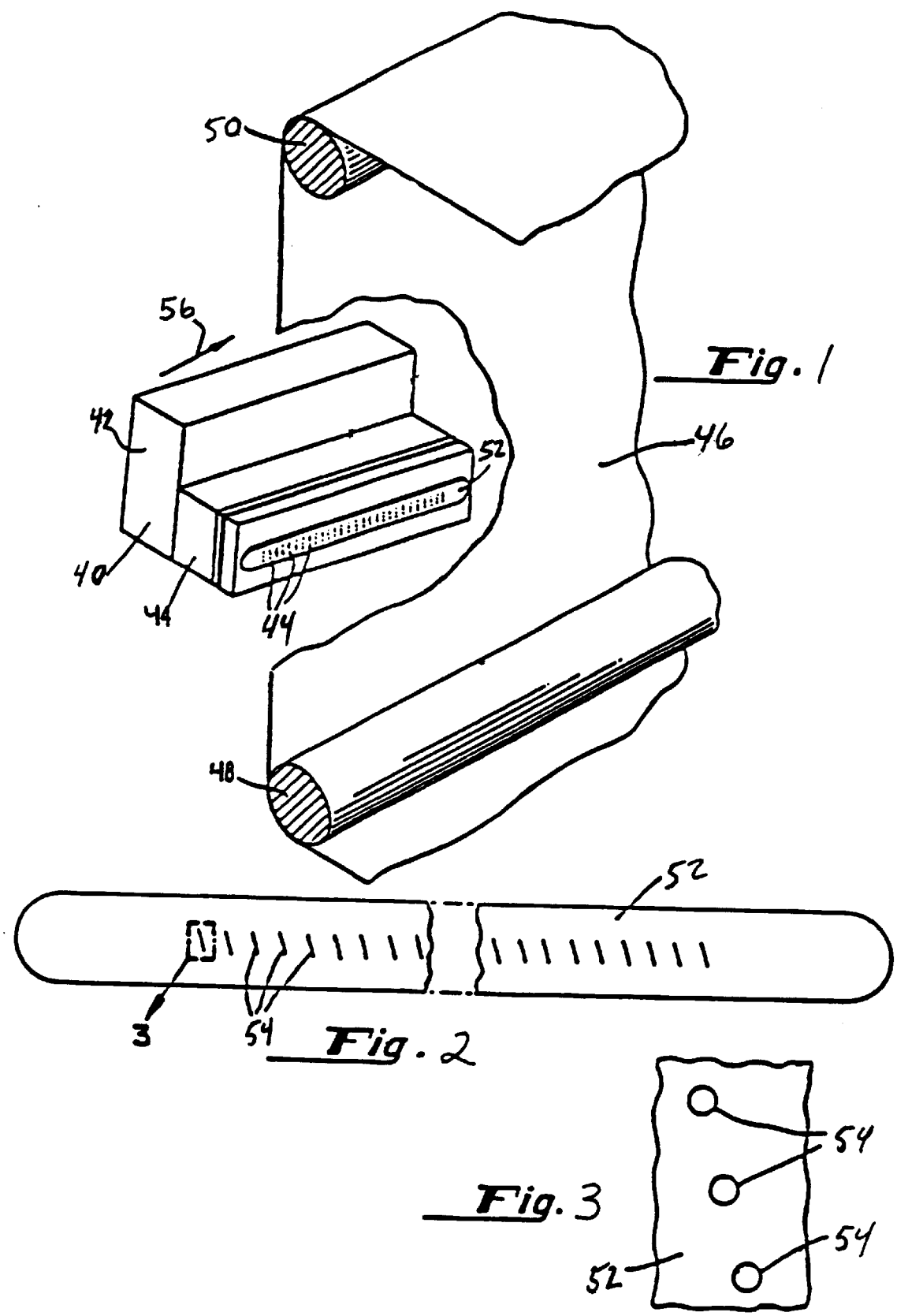

METHOD FOR REDUCING CAVITATION IN IMPULSE INK JET PRINTING DEVICES

CROSS-REFERENCE TO RELATED APPLICATIONS

This application is a continuation-in-part of U.S. Ser. No. 09/328,652, filed Jun. 9, 1999 now U.S. Pat. No. 6,439,709, which claims benefit of U.S. Provisional Application Serial No. 60/099,230, filed Sep. 4, 1998, the disclosures of each of which are hereby incorporated by reference in their entirety. The present invention is related by subject matter to the inventions disclosed in commonly assigned applications having U.S. Ser. No. 09/328,860, filed Jun. 9, 1999 and U.S. Ser. No. 10/134,880, filed Apr. 29, 2002, both of which are entitled "High Resolution Pigiment Ink For Impulse Ink Jet Printing."

FIELD OF THE INVENTION

This invention is directed to methods for reducing cavitation in impulse ink jet printing devices. The invention is further directed to ink compositions comprising antioxidant for used in impulse or drop on demand (DOD) ink jet printers. Additionally, the invention is directed to solvent-based pigment and dye inks containing antioxidant for reducing cavitation in impulse-type ink jet printing processes.

BACKGROUND OF THE INVENTION

Ink jet printing is performed by discharging ink droplets from a print head to a substrate. The droplets are ejected through orifices or nozzles in the print head and are directed to the substrate to form an image thereon. In contrast to many other types of printing, there is no contact between the printer and the substrate in ink jet techniques.

Most of the ink jet printers known in the art may be characterized as either continuous, thermal, or impulse devices, depending upon the mechanism by which the ink droplets are directed to the substrate. In continuous ink jet systems, an essentially uninterrupted stream of ink is ejected from a nozzle and breaks up into droplets. The droplets bear an electric charge so that they can be deflected by an applied electric field which is modulated according to the particular image to be recorded. The electric field directs the droplets toward either the substrate or an ink re-circulating reservoir. The inks employed in conjunction with continuous ink jet systems typically comprise a colorant such as a dye or pigment, an electrolyte to facilitate droplet deflection, and a liquid vehicle to dissolve or disperse the colorant and the electrolyte. While the vehicle in many continuous-type inks comprises water, U.S. Pat. No. 4,142,905, in the name of Cooke, disclosed a water-free ink composition consisting essentially of a low molecular weight glycol, an inorganic salt electrolyte, and a dye which is soluble in the glycol.

With so-called "impulse" or "drop-on-demand" ink jet printers, image formation is controlled by changing the rate of energization of a piezoelectric transducer rather than by modulating an applied electric field. Ink is stored in the print head or nozzle until it is necessary to form an image on the substrate on demand. The printer is then activated to apply pressure to the ink and discharge a selected number of discrete ink droplets toward the substrate. These ink droplets need not bear an electric charge. Accordingly, impulse ink compositions can be free of corrosive substances such as water and electrolytes which continuous ink jet inks often comprise.

However, impulse ink jet printers present a number of problems which are not encountered in continuous ink jet systems. For example, unlike continuous ink jet printers, impulse printers typically are maintained in a stand-by or temporarily inoperative mode between printing cycles. Thus, the ink is allowed to stand and possibly dry or solidify in the discharge orifices of the print head. Accordingly, subpulsing is often used to prevent ink from solidifying or drying while printer is inactive for a period of time. Many of the start-up problems encountered with impulse printers are attributable to ink which has been allowed to stand in the discharge orifices during stand-by periods. Such material is less of a concern in continuous systems because there typically are fewer interruptions in the flow of ink. Even where ink is allowed to stand and solidify, it is more easily purged due to the considerably higher pressures at which continuous inkjet printers operate. Accordingly, there is a need for impulse-type inks that remain stable, resist drying or solidifying in the printhead, and require less maintenance energy (e.g., subpulsing) during printer downtime.

Numerous ink compositions for impulse ink jet printers are known in the art. However, many of these inks are not suitable for bar code printing applications on porous, non-porous, or fibrous substrates. As will be appreciated by those of skill in the art, an ink applied to a substrate such as paper will tend to migrate or wick along the fibers of the paper until the wicking forces are countered by the ink viscosity. The extent to which the ink wicks will be dependent upon both its viscosity and the porosity of the substrate. Where highly porous substrates such as Kraft paper or corrugated cardboard are employed, many inks tend to wick excessively, leading to blurry, ill-defined printed images. One approach to clearer, more well-defined print images has involved the employment of a rapidly evaporating ink composition. However, rapid evaporation of the impulse-type ink often leads to clogging of discharge orifices during stand-by periods. Moreover, such rapid evaporation compositions are less desired because they commonly contain volatile organic components (VOCs) that can be harmful to the environment and human health. Another approach to clearer, more well-defined print images has involved the use of a pigment as a colorant instead of a dye. Where pigments are used as the colorant, the particle size employed must be small enough to achieve reliable performance in the printhead. Water-based pigment dispersions are known in the art that satisfy the printhead performance requirement, however, the reliability of these dispersions in the present application are unknown. In addition, for water-based pigment dispersions, the current state of the art limits the driving frequency of the printhead to between 3 and 8 kHz, resulting in a slower printing operation and through-put. Moreover, water-based pigmented ink systems have two major drawbacks. First, they are unreliable as they tend to settle during storage and in ink reservoirs. Second, water-based pigmented ink systems—especially when the particle size of the pigment gets smaller—tend to entrap more air which results in inconsistent jetting of ink drops.

In certain applications, it is necessary that the image created by an ink jet printer possess a relatively intense threshold color. For example, many optical character reading devices cannot read images unless they possess a minimum color intensity. Those skilled in the art will recognize that bar code images typically must possess a good print contrast signal (PCS) (preferably greater than about 90 percent) to be machine readable. However, many of the known techniques for increasing the color intensity of an ink—such as increasing the concentration of the colorant—often adversely affect important ink properties such as viscosity, surface tension, and stability.

Often, solvent-based ink jet inks contain various amounts of plasticizer to control ink properties such as viscosity and/or surface tension. Potentially harmful phthalate-based plasticizers, widely used for example in plastic products and cosmetics, have recently come under scrutiny as toxins to which people have been exposed at greater levels than previously thought. For example, dibutyl phthalate (DBP) has been widely detected in people. While the effects of DBP exposure are not known, the compound has recently been subject to regulation in Europe. With the possibility of more restrictions on the use of DBP, there is a current need for inks that do not contain DBP or other phthalates, yet possess the desired characteristics for ink jetting.

The inks and processes described herein address the need for solvent-based impulse-type ink jet ink composition capable of producing clear, well-defined, color-intense images on even porous and non-porous substrates while reducing cavitation in impulse ink jet printing devices. The present invention also addresses the need for inks that remain stable and resistant to drying during printer downtime. Even further addressed by the present invention is the need for jettable inks that do not contain phthalates.

SUMMARY OF THE INVENTION

The present invention provides methods for preventing the formation of gas bubbles inside of a piezo-type impulse fluid device, the piezo-type impulse fluid device having at least one fluid chamber with at least one orifice therein and a piezoelectric transducer coupled to the chamber, the method comprising the steps of: (a) supplying a dispersion ink composition to the fluid chamber, wherein the dispersion ink composition comprises: (i) from about 10 to about 50 percent by weight of a pigment dispersion, wherein the pigment dispersion comprises from about 25 to about 45 percent by weight of a pigment; from about 15 to about 45 percent by weight of a polymeric dispersant; and from about 25 to about 45 percent by weight of a dispersion medium, wherein the ratio of pigment to polymeric dispersant is from about 1:1 to about 1:0.7; (ii) from about 5 to about 20 percent by weight of a diol ether; (iii) from about 30 to about 80 percent by weight of a plasticizer; and (iv) antioxidant, wherein the ink composition is substantially free of water; (b) changing the rate of energization of the piezoelectric transducer such that the piezoelectric transducer expands and contracts the fluid chamber; and (c) ejecting a droplet of the ink composition from the at least one orifice.

The present invention further provides methods for preventing the formation of gas bubbles inside of a piezo-type impulse fluid device, the piezo-type impulse fluid device having at least one fluid chamber with at least one orifice therein and a piezoelectric transducer coupled to the chamber, the method comprising the steps of: (a) supplying a dispersion ink composition to the fluid chamber, wherein the dispersion ink composition comprises: (i) about 20 percent by weight of a pigment dispersion, wherein the pigment dispersion comprises from about 25 to about 45 percent by weight of a pigment; from about 15 to about 45 percent by weight of a polymeric dispersant; and from about 25 to about 45 percent by weight of a dispersion medium, wherein the ratio of pigment to polymeric dispersant is from about 1:1 to about 1:0.7; (ii) from about 7 to about 8 percent by weight of diol ether; and (iii) from about 70 to about 75 percent by weight of plasticizer; and (iv) antioxidant, wherein the ink composition is substantially free of water; (b) changing the rate of energization of the piezoelectric transducer such that the piezoelectric transducer expands and contracts the fluid chamber; and (c) ejecting a droplet of the ink composition from the at least one orifice.

In some embodiments, the present invention provides methods for preventing the formation of gas bubbles inside of a piezo-type impulse fluid device according to any of the methods described above wherein the ink composition is substantially free of dibutyl phthalate.

BRIEF DESCRIPTION OF THE DRAWINGS

The foregoing summary, as well as the following detailed description of the preferred embodiments, are better understood when they are read in conjunction with the appended drawings. The drawings illustrate preferred embodiments of the invention to illustrate aspects of the invention. However, the invention should not be considered to be limited to the specific embodiments that are illustrated and disclosed. In the drawings:

FIG. 1 is a perspective view of an impulse ink jet printing apparatus;

FIG. 2 is a plan view of an orifice plate of the printing appartus of FIG. 1;

FIG. 3 is a fragmentary view of the fragment 3 shown in FIG. 2;

DETAILED DESCRIPTION OF PREFERRED EMBODIMENTS

Figure 4A:
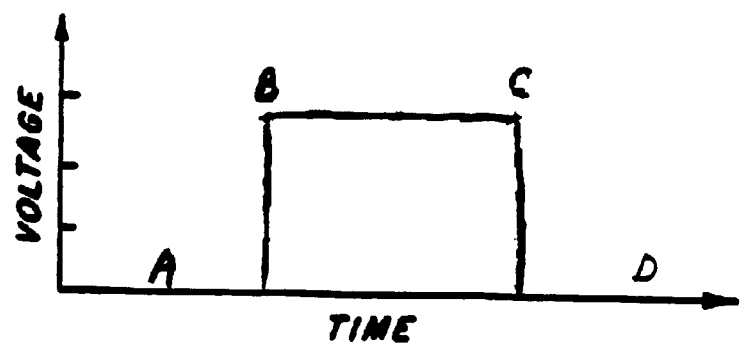
FIGS. 4A–E are diagrams of a device according to the present invention showing a firing signal applied to a piezoelectric print head chamber and the movement of ink within the chamber in response to the signal.
Figure 4B:
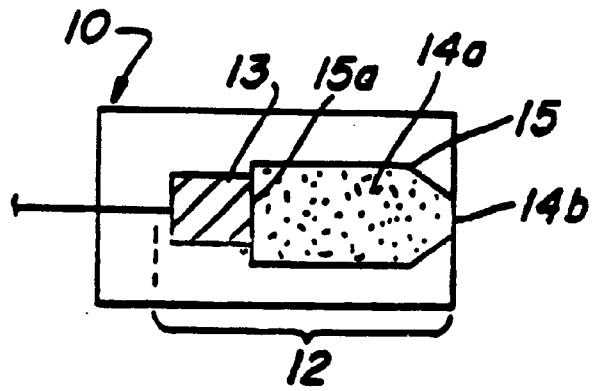
Figure 4C:
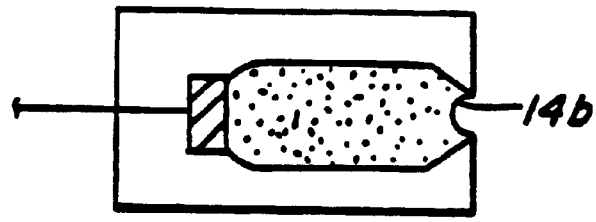
Figure 4D:
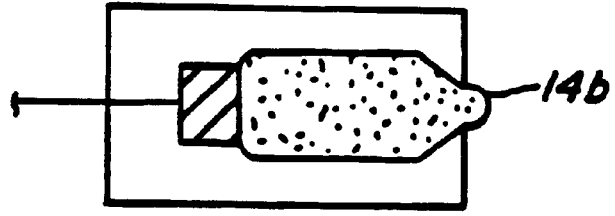
Figure 4E:
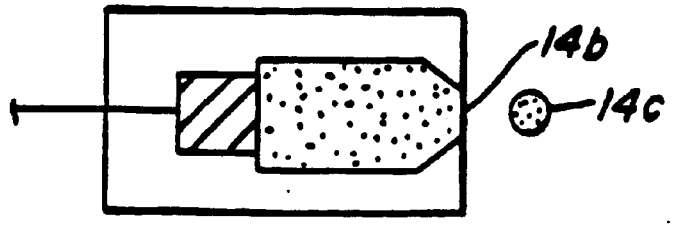

The present invention provides improved dispersion ink compositions for use with drop-on-demand or impulse inkjet systems. The invention further provides ink jet ink compositions capable of printing clear, well-defined alphanumeric text and narrow bar width bar codes on porous and non-porous substrates. Throughout the description, the invention is described in connection with a solvent based pigment dispersion wherein the dispersed pigment is carbon black. However, the particular pigment, and its associated color described herein, only illustrate the present invention and are not intended to be limitations. The invention is equally applicable to other pigments as long as the performance characteristics as herein described are not adversely affected. Accordingly, the invention should not be limited to the particular pigment described as the invention contemplates the application of other pigments.

As used herein, numerical ranges preceded by the term "about" should not be considered to be limited to the recited range. Rather, numerical ranges preceded by the term "about" should be understood to include a range accepted by those skilled in the art for any given element in impulse ink jet ink formulations according to the present invention.

The dispersion ink compositions of the present invention contain a pigment dispersion. The pigment dispersion contains at least a pigment, a polymeric dispersant, and a dispersion medium. Preferably, the dispersion medium is an ester, however other dispersion mediums are recognized by those skilled in the art, such as, for example, a glycol alkyl ether, a diol, or a diol ether are also suitable.

The pigment dispersion can be present in the dispersion ink compositions in an amount from about 10 to about 50, about 20 to about 50, about 10 to about 30, about 15 to about 25, or about 20 percent by weight.

According to the present invention, the pigment is present in the pigment dispersion from about 25 to about 45, preferably about 30 to about 40, more preferably about 35 to about 40, most preferably about 40 percent by weight. The preferred pigment is carbon black. It is further preferred that the pigment be processed such that it has an average particle size of about 0.01 to about 5 microns. In some embodiments, the particle size can be less than about 1 micron or about 0.6 or less microns in the final ink composition. Preferably, this is accomplished by filtering the final ink jet ink composition through a filter such as, for example, a POLYFLOW® 0.6 micron filter (commercially available from Arbor Tech, Ann Arbor, Mich.).

The selection of the pigment and its concentration is based primarily on its dispersability in the ink composition and the intensity of its color in light of the particular application. The pigment is selected to render the ink composition visible to the human eye or a mechanical data collection device such as a bar code scanner or other type of optical character readers as specified in the American National Standard Institute's Bar Code Print Quality Guideline (ANS X3.182—1990). Such optical reading devices generally operate in the wavelength range of from about 400 to about 980 nanometers. Preferably, images produced by the ink composition have a print contrast signal greater than about 90 percent. It will be recognized that print contrast signal is determined by subtracting the reflectance of the print from the reflectance of the paper and dividing the result by the reflectance of the paper and multiplying by 100. A preferred pigment is REGAL 660 carbon black (commercially available from Cabot Corporation, Billerica, Mass.).

The dispersant medium provides a substantially non-aqueous environment in which to disperse the pigment. The dispersion medium is present in the pigment dispersion in an amount of from about 25 to about 45, preferably about 30 to about 40, more preferably about 30 to about 35 percent by weight. Suitable dispersion mediums include glycol alkyl ethers, diols, diol ethers, and esters. According to some embodiments, the dispersion medium is an ester. Suitable esters can include formates, acetates, propionates, butyrates, oxalates, adipates, lactates, or mixtures thereof. Further suitable esters can be one or more of the many chemically distinct, low molecular weight esters or diesters, such as, for example, diethyl oxalate, dibutyl oxalate, dimethyl malonate, diethyl malonate, di-tert-butyl malonate, dimethyl succinate, diethyl succinate, diethyl adipate, dimethyl sebacate, diethyl azelate, methylene diacetate, ethylene glycol diacetate, 2,2,4-trimethyl-1,3-pentanediol diisobutyrate, triacetin, dibutyl sebacate, or mixtures thereof. According to some embodiments, the ester is dibutyl sebacate (n-decanoic acid di-n-butyl ester), such as, for example, UNIFLEX DBS (commercially available from Union Camp Corporation, Jacksonville, Fla.).

The polymeric dispersant is present in the pigment dispersion in an amount of from about 15 to about 45, preferably from about 20 to about 40 percent by weight. Preferred polymeric dispersants are polyurethanes, polyacrylates, and polymeric/fatty acid condensation polymers. More preferably, the polymeric dispersant is a polymer/fatty acid condensation polymer. Most preferably, the polymeric dispersant is a polyamine/fatty acid condensation polymer. The preferred polymer/fatty acid condensation polymer is SOLSPERSE 13940 (commercially available from Zeneca, Inc., Wilmington, Del.).

The polymeric dispersant is selected to effectively disperse the pigment. Preferably, the polymeric dispersant operates to disperse the pigment by adsorption onto the surface of the pigment and providing enough steric hindrance to keep the pigment dispersed. Preferably, the polymeric dispersant is also miscible with the dispersion medium. In this connection, the ratio of pigment to polymeric dispersant is critical to the storage stability and printhead performance of the ink compositions. Thus, according to some embodiments, the pigment dispersion is prepared wherein the ratio of pigment to polymeric dispersant is from about 1:1 to about 1:0.68, from about 1:1 to about 0.7, from about 1:0.8 to about 1:0.7, or about 1:0.75, based on neat dispersant that is 40% active.

The dispersion ink compositions according to the present invention further comprise from about 5 to about 40, about 5 to about 30, about 5 to about 20, about 5 to about 15, about 5 to about 10 percent by weight of diol ether. According to some embodiments, the diol ether constitutes from about 7 to about 8 percent by weight of the ink. Some inks according to the present invention comprise 7.5 percent by weight of diol ether. In other embodiments, the ink comprises about 19.8 percent by weight of diol ether. The diol ether can be present in the ink composition in an amount sufficient for building surface tension of the ink such that it is suitable for jetting. For example, jettable inks often have a surface tension greater than about 30 dynes/cm, such as from about 32 to about 38, at 25° C.

Also, the diol ether can be present in the ink in an amount sufficient to prepare an ink that is stable during printer downtime (e.g., for about 24 hours), even at elevated temperatures such as about 30, about 40, about 50, or about 60° C. Stable inks typically resist drying or solidfying on any part of the printhead, including the face plate. Stable inks also typically do not require subpulsing for maintenance or startup. Amounts of diol ether suitable for attaining these properties can range from 5 to about 15, about 5 to about 10, or about 7 to about 8 percent by weight.

Any diol ether that is compatible with the pigment dispersion can be suitable.

According to some embodiments, the diol ether can have a molecular weight less than about 400, and for polymeric diol ethers, a number average molecular weight of less than about 400. The diol either can also have a liquid phase between about 20 and about 70° C., as this is the temperature range within which impulse-type ink jet printers are most commonly operated.

The diol ether can comprise one or more of the many chemically distinct, low molecular weight diol ethers known in the art, such as, for example, ethylene glycol ethers, propylene glycol ethers, polyoxyethylene glycol ethers, polyoxypropylene glycol ethers, or mixtures thereof. For example, the diol ether can include ethylene-glycol monomethyl ether, ethylene-glycol monoethyl ether, diethylene-glycol monomethyl ether, diethylene-glycol monobutyl ether, 1-butoxyethoxy-2-propanol, diethylene-glycol monoethyl ether, ethylene-glycol monobutyl ether, ethylene-glycol monohexyl ether, phenyl glycol ethers, butoxytriglycol, methoxytriglycol, ethoxytriglycol, and the like, including mixtures thereof.

In some embodiments, the diol ether includes polyoxyethylene glycols such as ethoxytriglycol and methoxytriglycol. In further embodiments, the inks of the present invention include propylene glycol phenyl ether (DOWANOL PPh, W. H. Dow Center, Midland, Mich.).

The dispersion ink compositions according to the present invention further comprise from about 30 to about 80, about 40 to about 80, about 50 to about 80, 60 to about 80, or about 70 to about 80 percent by weight of plasticizer. According to some embodiments, the inks of the present invention comprise from about 70 to about 75 percent by weight of plasticizer. In other embodiments, plasticizer constitutes about 72 percent by weight of the ink. In further embodiments, the inks of the present invention comprise about 20 to about 50, about 30 to about 50, about 25 to about 35, or about 30 percent by weight of plasticizer.

The plasticizer can comprise one or more of the many chemically distinct plasticizers known in the art. Some suitable plasticizers include phthalates, such as, for example, butyl benzyl phthalate, dioctyl phthalate, diethyl phthalate, dibutyl phthalate, dimethyl phthalate, di-(2-ethylhexy)-adipate, diisobutyl phthalate, diisobutyl adipate, dicyclohexyl phthalate, dimethylisophthalate, or mixtures thereof, and the like. Other suitable plasticizers include glycerol tribenzoate, sucrose benzoate, polypropylene glycol dibenzoate, neopentyl glycol dibenzoate, dibutyl sebacate, and tri-n-hexyltrimellitate (commercially available as Morflex 560®).

According to some embodiments of the present invention, ink can contain plasticizer that includes dibutyl sebacate, tri-n-hexyltrimellitate, or a mixture thereof. Dibutyl sebacate can be included in inks as plasticizer in amounts ranging from, for example, about 40 to about 60, 45 to about 55, or about 50 percent by weight. Tri-n-hexyltrimellitate can be included in inks as plasticizer in amounts ranging from, for example, about 15 to about 30, about 20 to about 25, or about 22 percent by weight.

According to further embodiments, inks of the present invention are substantially free of phthalates, including dialkyl phthalates such as, for example, dibutyl phthalate.

The dispersion ink compositions as described above are substantially free of water.

It is desirable that the ink compositions of the present invention further comprise from about 0.01 to about 5.0, preferably between about 0.01 and about 2.0, more preferably less than 1.0 percent by weight of an antioxidant. Preferably, the antioxidant constitutes about 0.2 or about 0.5 percent by weight of the dispersion ink composition. The antioxidant is selected for its ability to improve the dynamic throughput performance in the printhead by reducing cavitation. Cavitation is the formation of gas bubbles in a liquid and is caused by the presence of dissolved gas in the liquid. Typically, the effects of cavitation are often compounded when the particular jetting fluid, as described by the present invention, includes particles (i.e., the pigment). Typically, the particles create nucleation sites for bubble growth.

An example dispersion ink composition according to the present invention is provided below.

| Component | Amount (% by weight) |
|---|---|
| pigment dispersion | about 20 |
| polypropylene glycol phenyl ether | about 7.5 (diol ether) |
| dibutyl sebacate | about 50 (plasticizer) |
| Morflex 560 (tri-n-hexyltrimellitate) | about 22 (plasticizer) |
| antioxidant (optional) | about 0.5 |

According to the above example ink formulation, the pigment dispersion component comprises about 40 percent by weight of pigment, about 30 percent by weight of dispersion medium, and about 30 percent by weight of polymeric dispersant. This example dispersion ink composition is also substantially free of phthalates, including dialkyl phthalates such as dibutyl phthalate.

The above ink is also representative of an impulse-type ink that is stable, even at elevated temperatures, during printer downtime (startup), showing little or no drying on the face plate of the printhead after 24 hours. Subpulsing is not required to improve or maintain jettability of the ink.

Suitable fast-drying inkjet ink formulations and apparatus are disclosed in U.S. patent application Ser. No. 09/328,653, filed on Jun. 9, 1999, which is incorporated herein by reference in its entirety.

The impulse ink compositions of the present invention can be used in the commonly known impulse inkjet printing devices. For example, U.S. Pat. No. 5,258,774, which is incorporated herein by reference in its entirety, discloses an ink jet apparatus of the type shown in FIGS. 1 through 3. The apparatus includes a print head 40 having a reservoir 42 and an imaging head of 44. The print head 40 is juxtaposed to a target 46 which is advanced by means of a transport system, including rollers 48 and 50, in an incremental fashion. As shown in FIG. 1, print head 40 includes an orifice plate 52, including orifices 54. In FIG. 1, the orifices are shown further apart from each other than they are in practice for purposes of illustration.

Referring again to FIGS. 1–3, the orifices 54 actually comprise a plurality of sets of orifices which are more fully described with reference to FIGS. 2 and 3. The sets of orifices 54 are vertically displaced as a result of the inclination of the print head 40 with respect to the scanning direction depicted by arrow 56. The orifices 54 are arranged in groups of three (3) and inclined on the orifice plate 52 so as to be substantially vertical when the print head 40 is inclined with respect to the scanning direction 56 as shown in FIG. 1. The hash marks 58 and the orifice plate actually show this angle of inclination. The angle of the orifices 54 in each group with respect to the vertical as shown in FIG. 2 is chosen such that when the orifice plate 52 is inclined as shown in FIG. 1, sets of orifices 54 will be vertical. As scanning in the direction depicted by the arrow 56 proceeds, there is no overlap of any droplets projected from the orifices so as to permit the apparatus as shown in FIGS. 1 through 3 to create a vertical bar when the droplets are ejected sequentially in the proper timed relationship. Of course, the droplets can also produce an alphanumeric character by ejecting appropriate droplets on demand.

Improved impulse ink jet printing devices are disclosed in U.S. Pat. Nos. 5,767,873 and 5,581,283, which are both incorporated in their entirety by reference. These patents disclose impulse ink jet printing devices having ink jet chambers having a plurality of orifices associated with each chamber.

Inside of an impulse-type printhead device, there is a piezo-electric device attached to a wall of a liquid chamber that expands and contracts causing an oscillating pressure field within the chamber. Referring now to FIGS. 4A–4E, one or more ink droplets 14c can be ejected from the nozzles 12 toward a substrate by selectively energizing and de-energizing piezoelectric transducers 13. In preferred embodiments, each transducer 13 is attached to a membrane, sealant, or some other flexible member 15a in physical contact with a volume of ink 14a contained within chamber 15. It is possible, however, that the transducer can be the chamber wall. The transducers are energized and de-energized through application of control signals. Although the control signal waveform could be selected from many known ink droplet firing signals, for brevity and simplicity of understanding, the firing control signal is shown in FIG. 4A in the form of a square wave.

Figure 5:
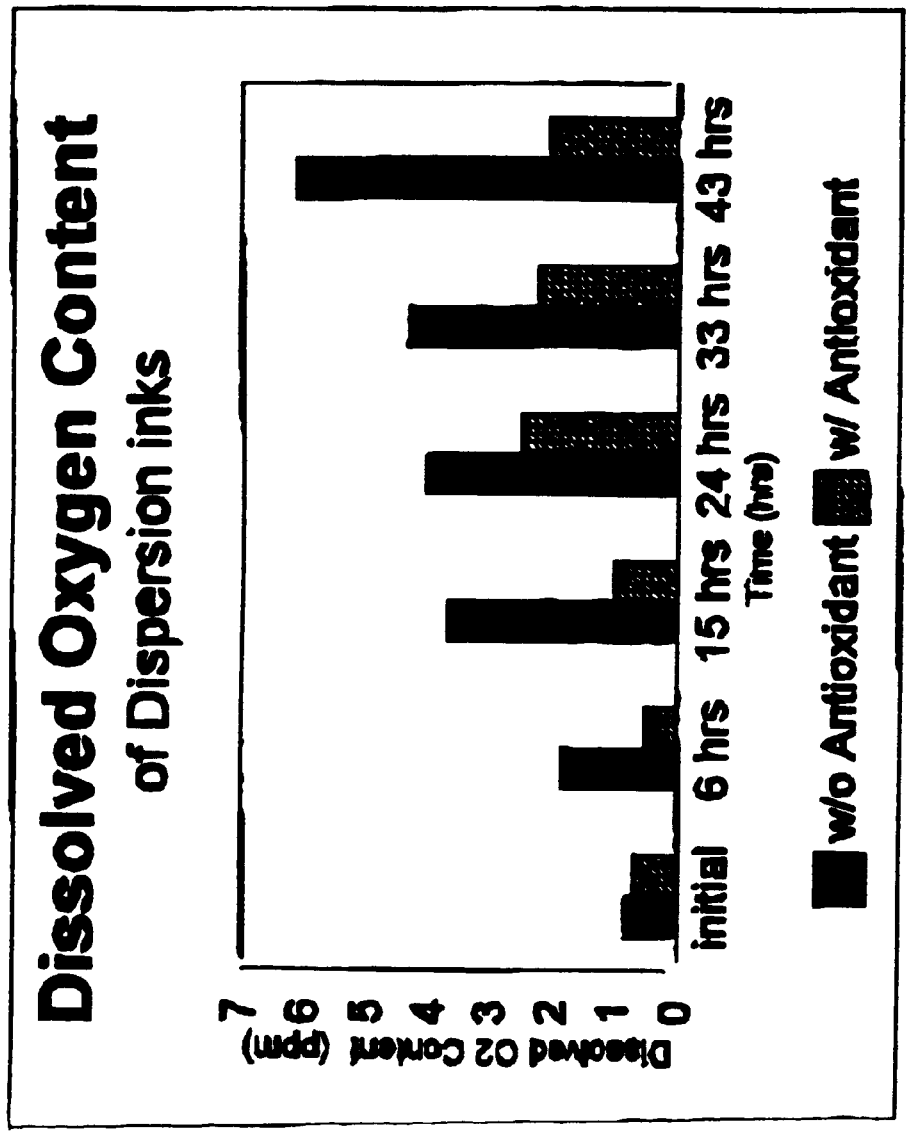
FIG. 5 illustrates the effect of an antioxidant on the ink compositions according to the present invention.

Formation of bubbles and the likelihood of their initial growth and subsequent shrinkage in the oscillating pressure field significantly reduce the printhead jetting performance. FIG. 5 illustrates the effect of the antioxidant in the dispersion ink. The antioxidant present in the ink composition lowers the dissolved oxygen in the ink, thereby significantly improving its performance.

Preferably, the antioxidant can comprise one or more of the many chemically distinct, known antioxidants such as naphthols, substituted phenols, oximes, and aromatic amines. Suitable antioxidants include, for example, eugenol, hydroquinone, pyrocatechol, guaiacol (methyl catechol), butylated hydroxytoluene, butylated hydroxyanisole, methyl ethyl ketoxime, butylaldoxime, and cyclohexanone oxime. Hydroquinone is particularly preferred.

It will be appreciated that an antioxidant, as disclosed above, can be added to other fluids that can be used and jetted in a piezo-type impulse ink jet apparatus to effectively reduce cavitation in the print head and improve the printhead jetting performance. Exemplary fluids include polymer solutions (both aqueous and non-aqueous), adhesives, and any kind of coating.

Suitable fast-drying inkjet ink formulations and apparatus are disclosed in U.S. patent application Ser. No. 09/328,653, filed on Jun. 9, 1999, which is incorporated herein by reference in its entirety.

Preferred fast-drying ink compositions comprise a solvent or a combination of solvents at from about 20 to about 95% by weight, a polymeric resin system at from about 1 to about 20% by weight, and a colorant at from about 1 to about 20% by weight.

The preferred fast-drying ink compositions comprise low-boiling solvents. Generally, the solvents selected have a boiling point below 150° C. Preferred low-boiling solvents include glycol alkyl ethers having about 3 to 20 carbon atoms, more preferably about 3–7 carbon atoms, and most preferably 4 carbon atoms, a ketone alcohol, such as, for example, diacetone alcohol, 1,4-butanediol, denatured ethanol, benzyl alcohol, and alkyl lactates. Glycol alkyl ethers are particularly preferred. The preferred glycol alkyl ether is propylene glycol methyl ether. The ink compositions according to this invention can comprise any one of the above solvents or mixtures thereof. Preferably, such solvent or combination of solvents will be present in the ink jet ink composition at from about 20 to about 95% by weight, more preferably at from about 50 to 90% by weight, and most preferably at from about 70 to about 88% by weight.

The preferred fast-drying ink compositions further comprise from about 1 to about 20% of a polymeric resin. Preferred polymeric resins include polyester resins, polyamides, polyvinylbuterol resins, such as for example, MOWIFOL B3020H (commercially available from Hoechst, United Kingdom), phenolic resins, such as, for example, ALNOVOL PN 320 (commercially available from Hoechst, United Kingdom), and acrylic resins, such as styrene acrylic resin. The polymeric resin system of the ink compositions according to this invention can comprise any one of the above polymeric resins or mixtures thereof. Preferably, the ink composition comprises about 1 to about 20% by weight of an alcohol-soluble polyester-based resin and about 1 to about 10% by weight of a styrene acrylic polymer resin. More preferably, about 5 to 15% of the alcohol-soluble polyester-based resin and about 3 to about 6% by weight of the styrene acrylic polymer resin, and most preferably about 9% by weight of the alcohol-soluble polyester-based resin and about 4.5% by weigh of the styrene acrylic polymer resin. One preferred alcohol soluble polyester is Prince 5180, manufactured by Lawter International, Northbrook, Ill. One preferred styrene acrylic polymer is Joncryl 678, available from S.C. Johnson & Son, Inc.

Preferred fast-drying ink compositions also comprise a colorant. The choice of colorant and its concentration principally depend on the solubility of the colorant and the intensity of its color for a particular application. Preferably, the colorant is selected to render the ink composition visible to the human eye or some mechanical data collection device, such as a bar code scanner or other type of optical character reader. A preferred colorant comprises a dye such as Orasol Black RLI, which is available from Ciba-Geigy Co. of Ardsley, N.Y. Preferably, the colorant comprises from about 1 to about 20% by weight of the ink composition.

The fast drying impulse inkjet ink compositions for use in the present invention have been formulated to typically dry in from about 3 to about 35 seconds when used to print 150 dots per inch (DPI) text, and from about 5 to about 100 seconds for 150 DPI block characters. All print tests were performed with a Microcoder 32/16 printhead (commercially available from Trident International, Inc., Brookfield Conn.). As a baseline, the dry times were measured on a glass substrate at ambient temperature and relative humidity with no extraneous heating device applied. As referred to hereinafter, the dry times were obtained by measuring the time required to observe no visible smearing of the printed characters or blocks when rubbed with a substrate such as, for example, paper or a cotton swab. Those skilled in the art will recognize that the drying times of the fast-drying impulse ink jet ink compositions of the present invention will vary based upon the composition of the solvent or solvents selected and the particular amounts of each solvent.

For example, one preferred fast-drying ink jet ink composition that demonstrates the desired fast-drying properties has been prepared as follows:

| | |
|---|---|
| Propylene Glycol Methyl Ether (solvent) | about 44.0% |
| Diacetone Alcohol (solvent) | about 40.6% |
| Prince 5180 (resin) | about 6.3% |
| Joncryl 678 (resin) | about 1.7% |
| Orasol Black RLI (dye) | about 7.4% |

This formulation typically exhibits a dry time on a glass substrate of about 50 seconds for 150 DPI bock characters and about 19 seconds for 150 DPI text at ambient temperature and relative humidity. This ink jet ink formulation, when printing 150 DPI text on a high density polyethylene substrate, will dry in about 7 to 9 seconds at ambient temperature. On matte-coated, non-glossy stock paper, ink jet ink formulation will dry in about 3 to 4 seconds at ambient temperature and relative humidity when printing 150 DPI text.

In comparison, a more preferred fast-drying ink jet ink composition that demonstrates the desired fast-drying properties has been prepared as follows:

| | |
|---|---|
| Propylene Glycol Methyl Ether (solvent) | about 22.5% |
| Denatured Ethanol (solvent) | about 55.0% |
| Benzyl Alcohol (solvent) | about 5.0% |

-continued

| | |
|---|---|
| Prince 5180 (resin) | about 9.0% |
| Joncryl 678 (resin) | about 4.5% |
| Orasol Black RLI (dye) | about 5.0% |

This formulation typically exhibits a dry time on a glass substrate of about 6 seconds for 150 DPI bock characters and about 3 seconds for 150 DPI text at ambient temperature and relative humidity. This ink jet ink formulation, when printing 150 DPI text on a high density polyethylene substrate, will dry in about 4 seconds at ambient temperature. On matte-coated, non-glossy stock paper, ink jet ink formulation will dry in about 2 seconds at ambient temperature and relative humidity when printing 150 DPI text.

Still, a most preferred fast-drying inkjet ink composition that demonstrates the desired fast-drying properties has been prepared as follows:

| | |
|---|---|
| Propylene Glycol Methyl Ether (solvent) | about 80.0% |
| Diacetone Alcohol (solvent) | about 5.0% |
| Prince 5180 (resin) | about 6.3% |
| Joncryl 678 (resin) | about 1.7% |
| Orasol Black RLI (dye) | about 7.4% |

This formulation typically exhibits a dry time on a glass substrate of about 20 seconds for 150 DPI bock characters and about 8.0 seconds for 150 DPI text at ambient temperature and relative humidity.

In one embodiment, water can be added to the fast-drying ink jet ink compositions as an additive to control an ink formulation's drying time, i.e., decrease the rate of drying, where especially fast-drying solvents are used, such as, for example, denatured ethanol. The water can be present at from about 1 to about 40% by weight. The particular amount of water used will depend on the volatility of the solvents used. The following fast-drying inkjet ink formulation illustrates another preferred fast-drying ink composition wherein water was added to control a dry time that was otherwise too fast to allow for control of the print quality:

| | |
|---|---|
| Denatured Ethanol (solvent) | about 67.0% |
| Distilled Water (additive) | about 10.0% |
| 1,4-butanediol (solvent) | about 3.0% |
| Mowifol B3020H (resin) | about 1.0% |
| Alnovol PN 320 (resin) | about 14.0% |
| Valifast 3806 (dye) | about 5.0% |

This formulation typically exhibits a dry time on a glass substrate of about 6.0 seconds for 150 DPI bock characters and about 3.0 seconds for 150 DPI text at ambient temperature and relative humidity. In comparison, this formulation, without the water added, would dry almost instantly and the print quality was difficult to maintain.

One skilled in the art will recognize that the fast-drying impulse ink jet ink formulations not only readily form a viscosity barrier at the orifice of the nozzle, but also eliminate the need for extraneous heating devices such as, for example, microwave heaters, forced hot air heaters, convection heaters, and the like, that are typically employed to increase the rate at which the ink dries on a substrate.

Figure 6:
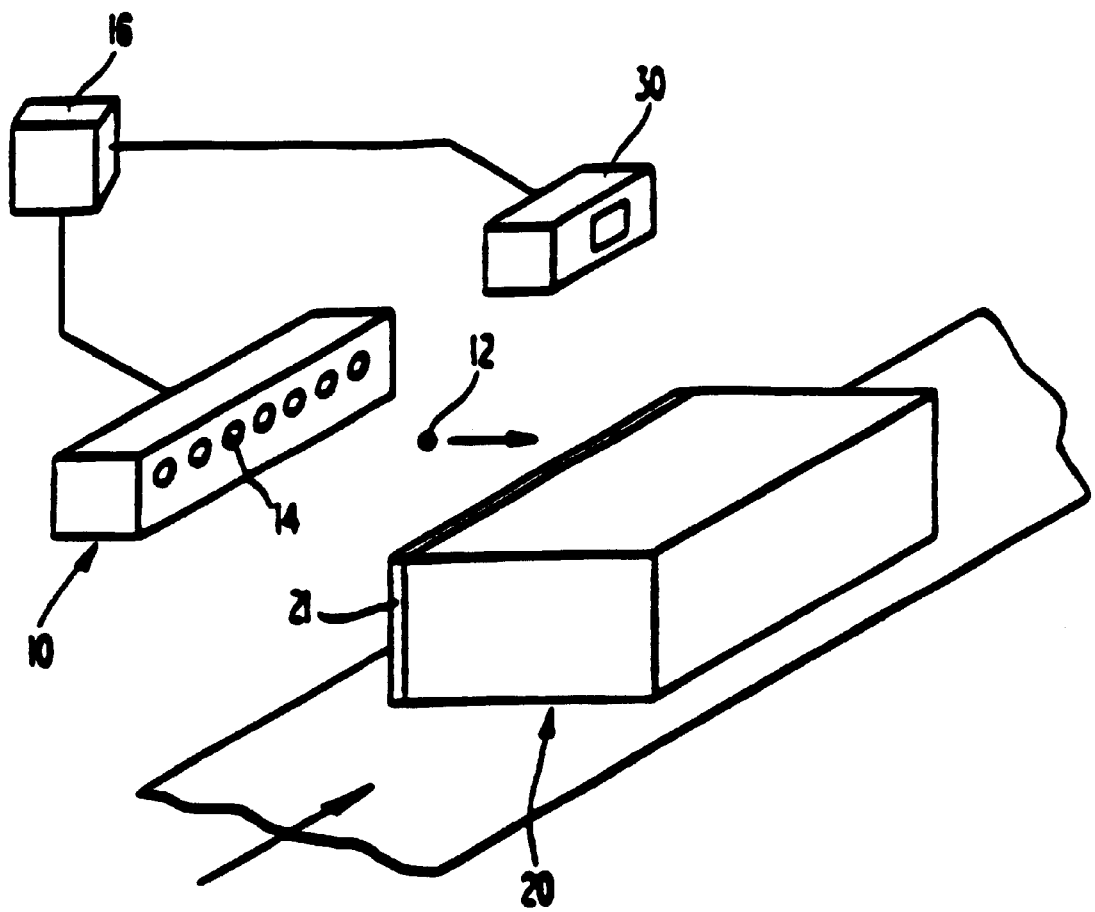
FIG. 6 depicts an impulse ink jet printing apparatus operated by a method in accordance with the present invention.

A preferred process according to the present invention is depicted in FIG. 6, wherein one or more droplets (12) of the ink composition are ejected from orifices (14) by selectively energizing and de-energizing piezoelectric transducers (not shown) in a print head (10). The operation of the transducers and, hence, the ejection of the droplet is controlled by a processing means (16) such as a computer. Such a process and system are disclosed in U.S. Pat. No. 4,646,106, which is incorporated herein by reference.

After ejection from the print head (10), the droplet (12) is directed to a receiving surface (21) on the substrate (20) to form a printed image. The printed image should be clear and well-defined, even on porous substrates such as kraft paper and corrugated cardboard. It will be recognized that the edge definition of a printed letter or character produced by an ink jet printer can be related to the capacity of the printer to form circular dots of perfect or near perfect circularity. It is preferred that the print images recorded in accordance with the present invention have circularity greater than about 0.7 and that said circularity be determined as set forth in U.S. Pat. No. 4,361,843 in the names of Cooke, et al., which is incorporated herein by reference.

Numerous printing substrates such as papers, glasses, metals, and plastics are known in the art to comprise receiving surfaces with which ink droplets can be contacted. It will be recognized that substrates can vary greatly in terms of physicochemical properties such as smoothness, porosity and surface treatment, and that such physicochemical properties will greatly influence the printing process and the choice of an ink composition. The ink compositions of the present invention form clear, well-defined bar code images on kraft paper, corrugated cardboard, and other relatively porous substrates having a smoothness of about 300 to about 450 Sheffield units, preferably between about 345 and about 400 Sheffield units. In comparison, various of the prior art dye-based ink compositions form ill-defined bar code images on the same porous substrate.

It is preferred that the processes of the present invention be performed at temperatures between about 20 and about 70° C., about 30 and about 60° C., or between about 40 to about 55° C. At these temperatures, suitable application viscosities of the ink compositions can be obtained. It is preferred that the ink have a viscosity between about 10 and about 15 cps at operating temperature of the impulse printer printhead. Operating temperatures can be, for example, about 30, about 40, about 50, about 55, or about 60° C.

It is also preferred that the ink composition has a surface tension of from about 32 to about 38 dynes/cm at 25° C.

As shown in FIG. 5, the substrate (20) preferably has a component of movement transverse to the path of the droplet (12). Such relative movement can be produced by moving the substrate (20) past a stationary print head (10), as shown in FIG. 5, or by moving the print head past a stationary substrate. The accuracy and/or clarity of the recorded information optionally can be determined by reading the information with a mechanical data collection device (30) positioned upstream from the print head (10).

Additional objects, advantages, and novel features of this invention will become apparent to those skilled in the art upon examination of the following examples thereof, which are not intended to be limiting, wherein parts and percents are by weight unless otherwise indicated.

EXAMPLE 1

A pigment dispersion ink was made by mixing the 400 grams of REGAL 660 carbon black pigment (Cabot Corporation, Billerica, Mass.) together with about 300 grams of UNIFLEX DBS dibutyl sebacate (Union Camp Corporation, Jacksonville, Fla.) and about 300 grams of 40–45 percent active SOLSPERSE 13940 polymeric dispersant (Zenica Colors, Inc., Wilmington Del.). The pigment to polymeric dispersant ratio was 1:0.75. The mixture was pre-mixed for about 2 hours in order to ensure proper wetting of the pigment. Next, the dispersion was charged into a media mill consisting of about 0.8 to about 1.0 millimeter zirconium-silicon dioxide beads. The dispersion was then mixed at high speeds in the media mill for about 5 hours to achieve grinding of the carbon black pigment. The dispersion was then filtered through a coarse filter to remove the media for additional use. The pigment dispersion of this example was very stable, exhibiting no gellation or separation of solids, indefinitely.

Next, about 400 grams of the above dispersion was diluted under agitation with about 198 grams of propylene glycol phenyl ether (DOWANOL PPh, W. H. Dow Center, Midland, Mich.) and about 400 grams of dibutyl phthalate. About 20 grams of the antioxidant, hydroquinone, was added next and the resultant ink composition was mixed for about 2 hours at room temperature. The ink composition was then filtered first through a 1.0 micron Glass-tech II filter followed by filtration through a 0.6 micron PolyFlow filter. The ink jet ink composition of this example exhibited excellent dynamic performance; excellent print qualities; a desirable viscosity of about 35 cps at about 25° C.; a desirable viscosity of about 12 cps at about 60° C.; and a surface tension of about 36 dynes/cm at 25° C.

Dynamic performance was measured by continuously printing bar codes for one hour using an Ultrajet II 352/32 impulse ink jet printhead (Trident International, Brookfield, Conn.). This impulse ink jet printhead has 11 orifices per channel. After one hour has passed, the print quality of the bar codes is evaluated. A clogged or air-entrained orifice will manifest as a visible defect in the printed bar code.

EXAMPLE 2

A pigment dispersion ink was made by mixing 400 grams of REGAL 660 carbon black pigment (Cabot Corporation, Billerica, Mass.) together with about 350 grams of UNIFLEX DBS dibutyl sebacate (Union Camp Corporation, Jacksonville, Fla.) and about 250 grams of 40–45 percent active SOLSPERSE 13940 polymeric dispersant (Zenica Colors, Inc., Wilmington Del.). The pigment to polymeric dispersant ratio was 1:0.62. The mixture was pre-mixed for about 2 hours in order to ensure proper wetting of the pigment. Next, the dispersion was charged into a media mill consisting of about 0.8 to about 1.0 millimeter zirconium-silicon dioxide beads. The dispersion was then mixed at high speeds in the media mill for about 5 hours to achieve grinding of the carbon black pigment. The dispersion was then filtered through a coarse filter to remove the media for additional use. The pigment dispersion of this example was unstable as solid pigment separated after about an hour.

EXAMPLE 3

A pigment dispersion ink was made by mixing 400 grams of REGAL 660 carbon black pigment (Cabot Corporation, Billerica, Mass.) together with about 300 grams of UNIFLEX DBS dibutyl sebacate (Union Camp Corporation, Jacksonville, Fla.) and about 300 grams of 40–45 percent active SOLSPERSE 13940 polymeric dispersant (Zenica Colors, Inc., Wilmington Del.). The pigment to polymeric dispersant ratio was 1:0.75. The mixture was pre-mixed for about 2 hours in order to ensure proper wetting of the pigment. Next, the dispersion was charged into a media mill consisting of about 0.8 to about 1.0 millimeter zirconium-silicon dioxide beads. The dispersion was then mixed at high speeds in the media mill for about 5 hours to achieve grinding of the carbon black pigment. The dispersion was then filtered through a coarse filter to remove the media for additional use. The pigment dispersion of this example was very stable, exhibiting no gellation or separation of solids, indefinitely.

Next, about 400 grams of the above dispersion was diluted under agitation with about 600 grams of UNIFLEX DBS dibutyl sebacate (Union Camp Corporation, Jacksonville, Fla.). The resultant ink composition was mixed for about 2 hours at room temperature. The ink composition was then filtered first through a 1.0 micron Glass-tech II filter followed by filtration through a 0.6 micron PolyFlow filter. The inkjet ink composition of this example exhibited good print qualities, however, compatibility problems were experienced with components of the printhead. The resulting viscosities were about 30 cps at about 25° C. and about 8.5 cps at about 60° C. The surface tension was about 30 dynes/cm at 25° C.

EXAMPLE 4

The pigment dispersion ink was made by mixing 400 grams of REGAL 660 carbon black pigment (Cabot Corporation, Billerica, Mass.) together with about 300 grams of UNIFLEX DBS dibutyl sebacate (Union Camp Corporation, Jacksonville, Fla.) and about 300 grams of 40–45 percent active SOLSPERSE 13940 polymeric dispersant (Zenica Colors, Inc., Wilmington Del.). The pigment to polymeric dispersant ratio was 1:0.75. The mixture was pre-mixed for about 2 hours in order to ensure proper wetting of the pigment. Next, the dispersion was charged into a media mill consisting of about 0.8 to about 1.0 millimeter zirconium-silicon dioxide beads. The dispersion was then mixed at high speeds in the media mill for about 5 hours to achieve grinding of the carbon black pigment. The dispersion was then filtered through a coarse filter to remove the media for additional use. The pigment dispersion of this example was very stable, exhibiting no gellation or separation of solids, indefinitely.

Next, about 400 grams of the above dispersion was diluted under agitation with about 198 grams of propylene glycol phenyl ether (DOWANOL PPh, W. H. Dow Center, Midland, Mich.) and about 400 grams of dibutyl phthalate. The resultant ink composition was mixed for about 2 hours at room temperature. The ink composition was then filtered first through a 1.0 micron Glass-tech II filter followed by filtration through a 0.6 micron PolyFlow filter. The ink jet ink composition of this example exhibited poor dynamic performance without the antioxidant. The print quality was satisfactory; the viscosity was about 44 cps at about 25° C.; the viscosity was about 13.5 cps at about 60° C.; and the surface tension was about 36 dynes/cm at 25° C.

EXAMPLE 5

A pigment dispersion ink was prepared by mixing 50 wt % dibutyl sebacate and and 22 wt % Morflex 560 (tri-n-hexyltrimellitate) at 40° C. for ½ hour while stirring continuously. Hydroquinone (0.5 wt %) was added to the solvent mix while at 40° C. After stirring for another ½ hour, 7.5% of PPH (propylene glycol phenyl ether) was added to the mixture while stirring at 40° C. Then added was 20 wt % of pigment dispersion while stirring continuously at 40° C. The ink was mixed for another two hours and then cooled to room temperature. The cooled ink was then filtered using 1.0 and 0.25 micron nominal filters and a 0.6 micron absolute final filter.

Those skilled in the art will appreciate that numerous changes and modifications can be made to the preferred embodiments of the invention and that such changes and modifications can be made without departing from the spirit of the invention. It is therefore intended that the appended claims cover all such equivalent variations as fall within the true spirit and scope of the invention.

Throughout this specification various groupings are employed to conveniently describe constituent variables of compounds and groups of various related moieties. It is specifically intended that each occurrence of such groups throughout this specification include every possible subcombination of the members of the groups, including the individual members thereof.

What is claimed is:

1. A method for preventing the formation of gas bubbles inside of a piezo-type impulse fluid device, said piezo-type impulse fluid device having at least one fluid chamber with at least one orifice therein and a piezoelectric transducer coupled to said chamber, the method comprising the steps of:
   (a) supplying a dispersion ink composition to the fluid chamber, wherein said dispersion ink composition comprises:
      (i) from about 10 to about 50 percent by weight of a pigment dispersion, wherein said pigment dispersion comprises from about 25 to about 45 percent by weight of a pigment; from about 15 to about 45 percent by weight of a polymeric dispersant; and from about 25 to about 45 percent by weight of a dispersion medium, wherein the ratio of pigment to polymeric dispersant is from about 1:1 to about 1:0.7;
      (ii) from about 5 to about 20 percent by weight of a diol ether;
      (iii) from about 30 to about 80 percent by weight of a plasticizer; and
      (iv) antioxidant, wherein said ink composition is substantially free of water;
   (b) changing the rate of energization of said piezoelectric transducer such that said piezoelectric transducer expands and contracts the fluid chamber; and
   (c) ejecting a droplet of said ink composition from said at least one orifice.

2. The method of claim 1 wherein said ink composition comprises less than about 2.0 percent by weight of said antioxidant.

3. The method of claim 1 wherein said ink composition comprises about 0.5 percent by weight of said antioxidant.

4. The method of claim 1 wherein said antioxidant is hydroquinone.

5. The method of claim 1 wherein said ink comprises from about 10 to about 30 percent by weight of pigment dispersion.

6. The method of claim 1 wherein said polymeric dispersant comprises polyurethanes, polyacrylates, polymer/fatty acid condensation polymers, or mixtures thereof.

7. The method of claim 1 wherein said dispersion medium comprises an ester.

8. The method of claim 7 wherein said ester is dibutyl sebacate.

9. The method of claim 1 wherein said diol ether comprises ethylene glycol ethers, propylene glycol ethers, polyoxyethylene glycol ethers, polyoxypropylene glycol ethers, or mixtures thereof.

10. The method of claim 1 wherein said diol ether comprises propylene glycol phenyl ether.

11. The method of claim 1 wherein said ink comprises from about 5 to about 15 percent by weight of diol ether.

12. The method of claim 1 wherein said plasticizer comprises dibutyl sebacate, tri-n-hexyltrimellitate, or a mixture thereof.

13. The method of claim 1 wherein said ink comprises from about 50 to about 80 percent by weight of said plasticizer.

14. The method of claim 1 wherein said ink is substantially free of dibutyl phthalate.

15. A method for preventing the formation of gas bubbles inside of a piezo-type impulse fluid device, said piezo-type impulse fluid device having at least one fluid chamber with at least one orifice therein and a piezoelectric transducer coupled to said chamber, the method comprising the steps of:
   (a) supplying a dispersion ink composition to the fluid chamber, wherein said dispersion ink composition comprises:
      (i) about 20 percent by weight of a pigment dispersion, wherein said pigment dispersion comprises from about 25 to about 45 percent by weight of a pigment; from about 15 to about 45 percent by weight of a polymeric dispersant; and from about 25 to about 45 percent by weight of a dispersion medium, wherein the ratio of pigment to polymeric dispersant is from about 1:1 to about 1:0.7;
      (ii) from about 7 to about 8 percent by weight of diol ether; and
      (iii) from about 70 to about 75 percent by weight of plasticizer; and
      (iv) antioxidant, wherein said ink composition is substantially free of water;
   (b) changing the rate of energization of said piezoelectric transducer such that said piezoelectric transducer expands and contracts the fluid chamber; and
   (c) ejecting a droplet of said ink composition from said at least one orifice.

16. The method of claim 15 wherein said ink composition comprises about 0.5 percent by weight of anitoxidant.

17. The method of claim 15 wherein said ink comprises about 7.5 percent by weight of said diol either.

18. The method of claim 15 wherein said ink comprises about 72 percent by weight of said plasticizer.

19. The method of claim 15 wherein said plasticizer comprises dibutyl sebacate, tri-n-hexyltrimellitate, or a mixture thereof.

20. The method of claim 15 wherein said ink composition is substantially free of dibutyl phthalate.

* * * * *